April 28, 1970 — E. PAFFRATH — 3,508,572
CONSTRICTIVE CONNECTOR FOR HOSE
Filed Jan. 16, 1968
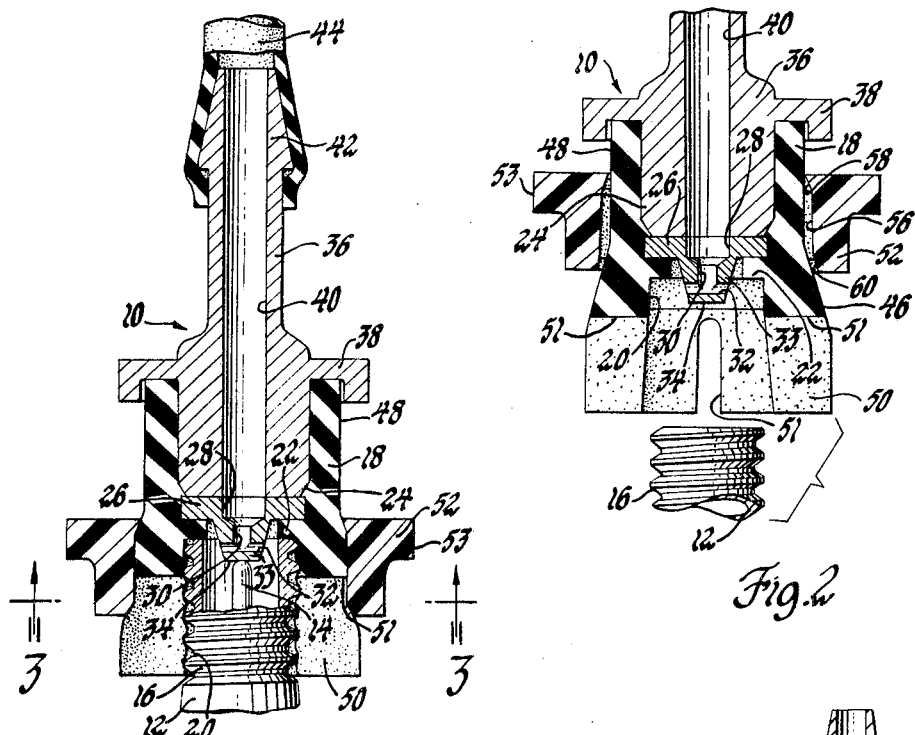
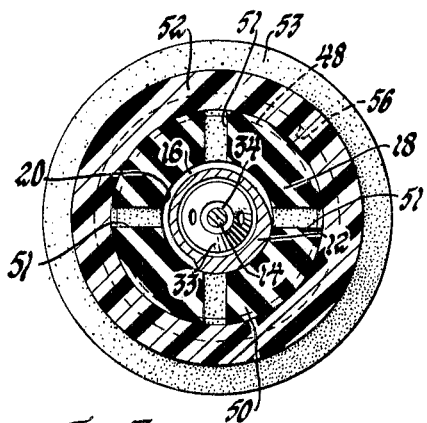
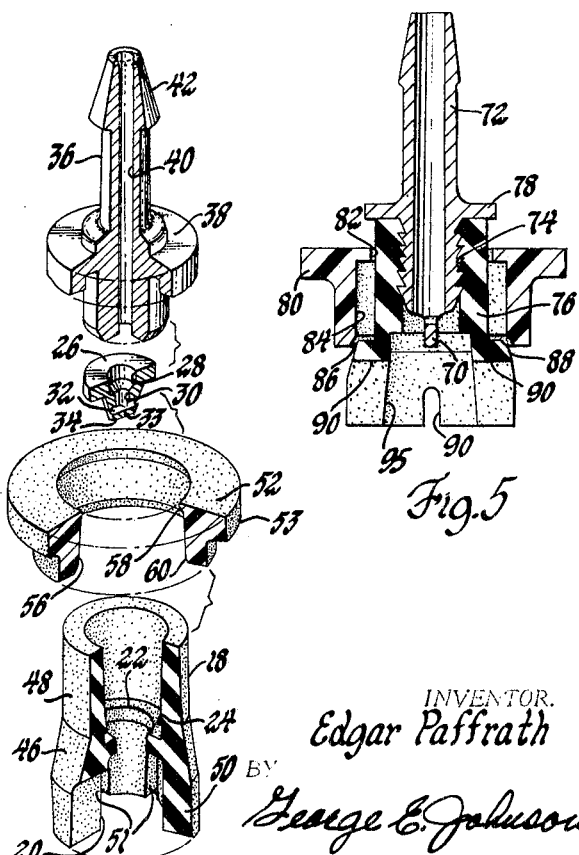
INVENTOR.
Edgar Paffrath
By George E. Johnson
ATTORNEY United States Patent Office 3,508,572
Patented Apr. 28, 1970

3,508,572
CONSTRICTIVE CONNECTOR FOR HOSE
Edgar Paffrath, Saginaw, Mich., assignor to General Motors Corporation, Detroit, Mich., a corporation of Delaware
Filed Jan. 16, 1968, Ser. No. 698,247
Int. Cl. F16k 15/20
U.S. Cl. 137—231                    1 Claim

ABSTRACT OF THE DISCLOSURE

A hose and tire valve stem connector with resilient material adapted to be releasably constricted about a tire valve stem for frictionally holding the connector in its functional position and its parts being relatively movable for quick attachment and release with corresponding opening and closing of a valve in the stem.

---

This invention relates to conduit connectors and more particularly to quickly releasable connectors such as a connector between an air hose and a tire valve stem.

Automobile tires generally are provided with threaded or yieldable connections through which air is forced to effect inflation. Such connections must rely either on threads on the valve stem as a positive holding means or on manually applied force to maintain the connection fluid-tight and also an open state of the valve during the tire pumping operation. Threading of a connector of the first type consumes time and the reliance upon manually applied force with reference to the second type takes considerable effort and restricts the operator.

An object of the present invention is to provide an improved connector having frictional holding means for encircling or clamping a stem enclosing a valve pin and which may be quickly engaged or disengaged with respect to the stem and pin.

To this end a feature of the present invention is a connector in the form of a unit having coaxial parts, one of these parts being of yieldable and rubberlike material defining a recess to receive a valve stem and restrictable frictionally to engage that stem, and another part being retained on the one part and axially movable to effect or reduce the restriction to maintain or terminate an operative position and function of the connector.

These and other features of the invention will now be described in detail in the specification and then pointed out more specifically in the appended claims.

In the drawings:

FIGURE 1 is a cross sectional view of a connector as one embodiment of the present invention and as mounted in functional position on a valve stem;

FIGURE 2 is a view similar to that of FIGURE 1 but with the connector removed or disconnected from the valve stem;

FIGURE 3 is a sectional view looking in the direction the arrows 3—3 in FIGURE 1;

FIGURE 4 is an exploded and perspective view of the connector of FIGURES 1, 2, and 3 with portions broken away better to illustrate the construction; and FIGURE 5 is a sectional view of a modified version of the connector.

A connector 10 is shown in FIGURE 1 as being operatively positioned upon the end of a tire valve stem 12. The latter includes a conventional pin 14 for operating the tire valve and threads 16 adapted to hold the conventional valve cup.

An intermediate element of the connector 10 is shown at 18 and this is made of yieldable and rubbery-like material which defines a recess 20 at one end of the connector. This recess is of adequate size frictionally to hold the threaded end of the stem 12. An annular inner rib 22 is made integral with the element 18 and this rib cooperates with a second annular rib 24 tightly to hold a perforated member 26 in position within the element 18. The member 26 has a central opening 28 which connects with a smaller opening 30 and a cross passage 32. The bottom side of the member 26 presents a depending frusto-conical projection 33 extending into the recess 20 and the lower end of the projection 33 presents a solid surface 34 for engaging the pin 14.

A second part of the connector is a tubular element 36 having a flange 38 closely contacting the upper end of the one part 18 and it also bears a through and axial passage 40. One end 42 of the second part 36 is so made as to be connected easily and permanently to a flexible hose 44.

When released, the first part 18 is contoured as shown in FIGURE 2 and bears a frusto-conical outer surface 46, a cylindrical surface 48, and a slotted sleeve portion 50 surrounding the recess 20. Slots 51 are evenly spaced around the portion 50.

A third part of the connector 10 is shown in the form of a collar 52. This is of a material more rigid in nature (a higher modulus of elasticity) than that of the first part 18 and it could be made of hard plastic or of metal. It bears an annular peripheral flange 53 extending beyond the flange 38 of the second or tubular part 36. An opening 56 in the collar 52 is slightly greater in diameter than the surface 48. That opening is cylindrical and terminates at two similarly inclined surfaces 58 and 60. These surfaces are inclined at the same angle as the undistorted surface 46 on the one part 18.

Assuming that the connector 10 of FIGURE 2 is to be attached to the stem 12, the parts 18 and 40 pushed down upon the stem 12 so that the latter extends into the recess 20 and forms a seal at the rib 22. The third part or collar 52 is then pushed down on the stem 12 so that the surfaces 60 and 56 will reduce the outer diameter of the soft material of the first part 18 with the result that that soft material will firmly engage the threads or rough surface 16 on the stem. Prior to pushing on the collar 52, of course, the projection surface 34 will have engaged the valve pin 14 and opened the valve in the stem. The rib 22 within the one part 18 forms a stop as well as an effective seal with the end of the stem 12. With the parts positioned as shown in FIGURE 1, air may enter from the hose 44 and pass through the passages 40, 28, 30, and 32 into the tire.

The connector 10 may be quickly released from the stem 12 by pulling up on the third part or collar 52 causing the sleeve portion 50 of the one part 18 to enlarge in diameter and to be released from the threads or roughened surface of the stem. Friction between the latter and part 18 permits the relative movement between the parts 18 and 52 prior to release.

In the modified structure of FIGURE 5, a projection 70 is made in the form of a bridge integral with a tubular housing part 72 and the latter is provided with special annular teeth 74 for holding a one part 76 of soft yieldable material tightly against a flange 78 formed on the second part 72. A third part or collar 80 is apertured as at 82 slidably to receive a cylindrical part of the one part 76 and the collar 80 also includes an enlarged recess 84 which terminates with an inclined surface 86 facing an inclined surface 88 on the one part 76. Slots 90 of variable depth are made in the bottom portion of the one part 76 so that a recess 95 may be expanded to receive or restricted to grasp the end of a valve stem. In this version, a separate projection or valve pin depressor member 26 such as in the version of FIGURE 1 is eliminated and the structure is therefore simplified. Threads on the stem are not essential in practicing the present invention. In some cases roughening of the stem surface will not be required. It is necessary that the friction between the stem and the constricted part 18 or 76 be such as effectively to perform the holding operation.

I claim:

1. A hose and tire valve stem connector adapted to be releasably engaged about a tire valve stem for quick attachment and release comprising: an intermediate member having inclined outer surfaces and being of resilient yieldable material having a through passage therein and having a recess at one end of said intermediate member in communication with said through passage, with the recess being adequate to receive an end of a valve stem, a tubular member having a hose connector at the end opposite the recess in said intermediate member adapted to receive an air hose and being fixed to said intermediate member and also having a through passage therein, in communication with the passage in said intermediate member to admit air, separately formed projection between said intermediate member and said tubular member and extending from said tubular member into said recess to form a part of the through passage in said intermediate and tubular members with said projection being a valve stem pin depressor, said projection being held in position by a shoulder on said intermediate member, with the bottom of said tubular member abutting against the projection to force the projection against the shoulder, a moveable collar surrounding said intermediate member and having inclined inner surfaces facing said inclined outer surfaces on said intermediate member and being adapted to mate therewith during movement along the inclined surfaces of said intermediate member, said intermediate member having equally spaced slots at the end opposite said tubular member to provide a resiliency in the recess portion of said intermediate member, whereby axial movement of said collar along the inclined outer surfaces of said intermediate member changes the shape of said intermediate member by movement of the slotted end to effect a clamping and unclamping action of said tire valve stems.

References Cited

UNITED STATES PATENTS

| | | | |
|---|---|---|---|
| 1,001,069 | 8/1911 | Nielsen | 285—322 XR |
| 2,141,033 | 12/1938 | Crowley | 137—231 |
| 2,159,150 | 5/1939 | Heintz | 285—322 XR |

HAROLD W. WEAKLEY, Primary Examiner

U.S. Cl. X.R.

137—798; 251—149.7; 285—323